United States Patent [19]

Kimura

[11] Patent Number: 4,793,245

[45] Date of Patent: Dec. 27, 1988

[54] VACUUM COFFEE MAKER

[75] Inventor: Shinichi Kimura, Yamatokoriyama, Japan

[73] Assignee: Sharp Kabushiki Kaisha, Osaka, Japan

[21] Appl. No.: 163,628

[22] Filed: Mar. 3, 1988

[30] Foreign Application Priority Data

| Mar. 3, 1987 [JP] | Japan | 62-31633 |
| Mar. 6, 1987 [JP] | Japan | 62-33360 |
| Mar. 11, 1987 [JP] | Japan | 62-35473 |
| Mar. 13, 1987 [JP] | Japan | 62-37521 |
| May 20, 1987 [JP] | Japan | 62-76232 |

[51] Int. Cl.$^4$ .................................... A47J 31/043
[52] U.S. Cl. ........................ 99/292; 99/299
[58] Field of Search ............ 99/279, 280, 283, 285, 99/288, 292, 293, 299, 306; 426/433

[56] References Cited

U.S. PATENT DOCUMENTS

| 2,181,578 | 11/1939 | Cory | 99/299 |
| 2,285,114 | 6/1942 | Ferris | 99/299 |
| 2,543,528 | 2/1951 | Kaufmann | 99/292 |
| 2,619,895 | 12/1952 | Schott | 99/292 |
| 2,747,740 | 5/1956 | Curtis | 99/292 |
| 2,824,509 | 2/1958 | Trogden | 99/292 |

Primary Examiner—Robert W. Jenkins
Attorney, Agent, or Firm—Birch, Stewart, Kolasch & Birch

[57] ABSTRACT

A vacuum coffee maker including; a first container having a handle on the outer periphery and an opening on the top thereof, a second container in a funnel shape having a handle on the outer periphery thereof and engaging the opening of the first container in a sealed state by a gasket interposed therebetween, wherein the bottom is vertically provided with a pipe, an engagement retaining means, whereby the engagement of the first container with the second container is retained by the gasket being compressed and interposed therebetween, and a heating means having a heater and a heating plate whose outer dimension is greater than that of the bottom of the first container, whereby a liquid inside the first container which is to be mounted on the heating plate is heated, and a control valve which is provided inside the handle of the second container and opened or closed by a shape-memory alloy.

5 Claims, 6 Drawing Sheets

VACUUM COFFEE MAKER

BACKGROUND OF THE INVENTION

This invention relates to a vacuum coffee maker.

The construction of a conventional vacuum coffee maker is to be described referring to FIG. 10. In FIG. 10, reference numeral 101 indicates a first container (flask) wherein water (or boiling water) 102 is received, reference numeral 103 indicates a second container (funnel) wherein a pipe 104 is vertically mounted on the bottom and a filter 105 fitted to the inner bottom thereof, and reference numeral 106 a cylindrical gasket provided for the funnel 103 with which the gasket 106 is sealingly inserted in the flask 101 by press-fitting the gasket 106 deeply inside the opening of the flask 101. FIG. 10 illustrates the state in which the boiling water 102 in the flask 101 has been forced upward into the funnel 103 due to the increase in pressure inside the flask 101, therefrom a coffee solution 102a inside the funnel 103 is retrieved into the flask 101 by way of the filter 105 and pipe 104 when the state of negative pressure is returned due to the fall in temperature inside the flask 101. Then, the coffee solution 102a in the flask 101 can be poured into coffee cups, etc. after the funnel 103 has been drawn from the flask 101.

In use of the conventional vacuum coffee maker, a funnel even in the hot state after the extraction of a coffee essence must be drawn from a flask by a bare hand because of the funnel having no handle, which, however, has not been a favored way in handling the vacuum coffee maker because of a possibility of hazards such as burn. To solve such a problem, it is conceivable to provide a handle for each of both flask and funnel. However, the flask is subject to slip and drop from the funnel, thereby resulting in breakage on the ground, when only the handle on the funnel is handled after the only provision of the handle for the flask and funnel. This is because of the funnel having only been inserted in the flask with a gasket interposed therebetween.

Also, there is such a problem that a large quantity of force is required for drawing the funnel from the flask because of the construction of the conventional coffee maker having the funnel which is simply inserted into the opening of the flask whereinto a cylindrical gasket is deeply inserted so as to seal the funnel and flask, which may be a critical matter especially when the inside of the flask is in the state of negative pressure immediately after the extraction of the coffee essence.

SUMMARY OF THE INVENTION

An object of the present invention is to solve such problems as stated above as well as improving the safety in handling a vacuum coffee maker.

A vacuum coffee maker according to the present invention comprises a first container having a handle on the outer periphery and an opening on the top thereof, a second container in a funnel shape having a handle on the outer periphery thereof and engaging the opening of the first container in a sealed state by a gasket interposed therebetween, wherein the bottom is vertically provided with a pipe, an engagement retaining means, whereby the engagement of the first container with the second container is retained by the gasket being compressed and interposed therebetween, a heating means comprising a heater and a heating plate whose outer dimension is greater than that of the bottom of the first container, whereby a liquid inside the first container which is to be mounted on the heating plate is heated, and a control valve which is provided inside the handle of the second container and opened or closed by a shape-memory alloy.

According to the present invention, by virtue of the provision of the handle for each of both first and second containers, the coffee maker can be handled without a possibility of hazards such as burn even immediately after the extraction of coffee essence, and the first container is no longer subject to slip, drop, and breakage even if the handle on the second container was held for transport since the coffee maker is equipped with the engagement retaining means. Further, the coffee maker according to the present invention has such an advantage that the second container can be drawn with a small quantity of force from the first container which is in the state of negative pressure, since the gasket is not press-fitted deeply inside the opening of the first container.

A first container according to the present invention preferably comprises a container body made of glass having a second opening at the bottom and a metallic bottom lid, which closes the second opening thereof, the bottom lid having a rising wall including a plurality of slits around the outer peripheral edge thereof and securely fitted to the container body by the rising wall which is covered with a covering member.

Such a construction of the first container as described above allows a connection of the metallic bottom lid to the glass container body without the aid of any special tool, bonding means, etc., as well as the provision of excellent working conditions in assembly and easy repair of parts thereof. Further, the container can be improved in heat efficiency, design, and appearance by virtue of the covering member.

Also, the coffee maker according to the present invention may be comprised such that a first container and/or a second container comprises a container body, a metallic belt having at least one slot in the longitudinal direction, and an annular member integrally formed with a handle having the same quantity of projections as that of the slots which can be fittingly inserted therein, the annular member being secured on the container body by means of the metallic belt.

Thus, without slipping out of place the annular member can be stably fitted on the container body, thereby allowing the handle being stably disposed on the container member as well.

A heating means may be comprised such that a heating means comprises a heater, a heating plate and a heat sensing device, the heating plate having a concave which corresponds to the bottom shape of the first container and a hole at the center thereof, a heat sensing device being provided in the hole so as to detect change of temperature of the bottom center of the first container.

Thus, with the construction as above the heating plate can be immediately cooled to facilitate the reduction of its temperature, while the first container can be securely mounted on the heating plate at all times so as to arrange the position between the first container and heat sensing device as desired, thereby achieving a stable operating condition.

Further, an engagement retaining means preferably comprises a first engagement socket disposed on a portion of the edge of the outer periphery of the opening of the first container, a second engagement socket disposed on the end of the fixed side of the handle of the first container, and first and second convex portions disposed on the second container in correspondence with the first and second engagement sockets.

DETAILED DESCRIPTION OF THE PREFERRED EMBODIMENTS

An embodiment depicted in FIGS. 1 to 5 according to the present invention is to be described hereinafter.

Figure 1:
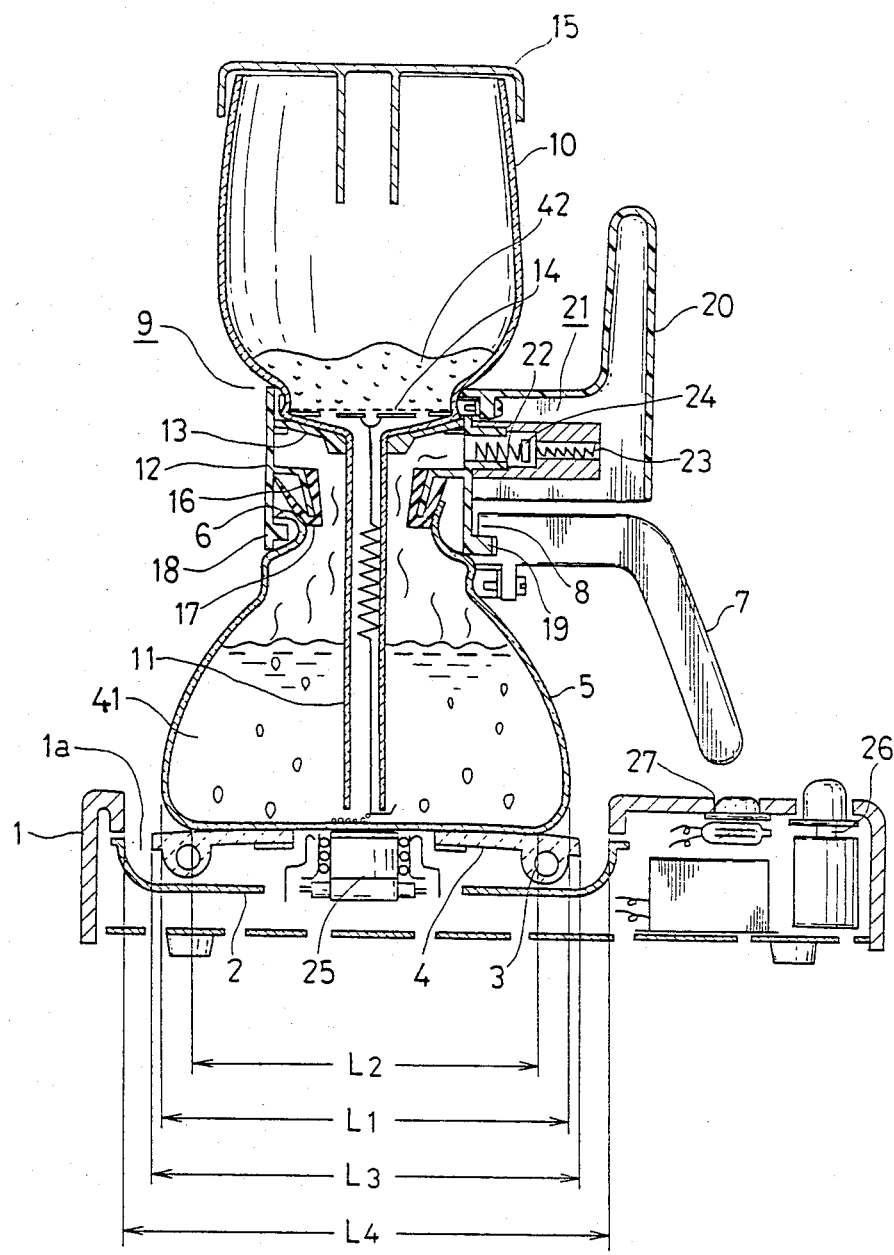
FIG. 1 is a longitudinally sectioned view of an embodiment according to the present invention.

Referring now to FIG. 1, a heating means 1 is fitted with a shield 2 inside thereof, and a heating plate 4 in which a heater 3 is integrally incorporated is disposed on the shield 2. A first container (flask) 5 forms a pouring opening 6 on an appropriate part of the upper opening as well as providing at the opposite position of the pouring opening 6 a handle 7 which is made of synthetic resin. A second engagement socket 8 among a pair of engagement sockets provided on the flask 5 is formed at the fixed end of the handle 7, while a first engagement socket is in combined use with the pouring opening 6 of the flask 5.

A second container (funnel) 9 comprises a container (funnel) body 10 which is made of glass and vertically provided with a pipe 11 at the lower part of the bottom thereof, and a container support (annular member) 12 which is made of synthetic resin and integrally fixed on the outer periphery of the funnel body 10 with a gasket 13 interposed therebetween. The funnel body 10 whose inner bottom is removably fitted with a filter 14 receives coffee powder on the filter 14, and the upper opening thereof can be closed by means of a cover 15. The funnel support 12 integrally forms a cylinder 16 which is located at an adequate space on the outer periphery of a pipe 11 inside thereof, and the cylinder 16 is fitted with a gasket 17. Also, the funnel support 12 integrally forms ag the lower end an engagement projection 18 which is a first convex portion and faces inside and an engagement projection 19 which is a second convex portion and faces outside, thereby constituting an engagement support means with each of the engagement sockets and engagement projections.

The fitting construction of the funnel 10 to the funnel support 12 is to be described referring to FIGS. 2 to 4 as follows.

A metallic belt 30 is bound on an annular groove 29 which is formed on the outer periphery of the bottom of the funnel body 10. The belt 30 comprising a tapped hole 31 on one end and a through hole 32 on the other end thereof forms a plurality of slots 33 in a longitudinal direction including an outward cylindrical wall 34. The funnel support 12 integrally forms a plurality of projections 35 which are inserted in the slots 33 of the belt 30, any of the projections 35 and cylindrical wall 34 having a height of several millimeters.

To mount the funnel body 10 on the funnel support 12, first the belt 30 is located inside the funnel support 12 so as to insert each projection 35 into each slot 33, next the funnel body 10 is inserted into the funnel support 12 from the top thereof so as to place the annular groove 29 in such a manner as to face the belt 30, and then a screw 36 is screwed in the tapped hole 31 by way of a through hole 37 of the funnel support 12 and the through hole 32 at one end of the belt 30. The belt 30 whose diameter is gradually tapered in accordance with screwing of the screw 36 is bound on the periphery of the funnel body 10. However the diameter of the belt 30 is tapered at this moment, the projections 35 inserted in the slots 33 are not subject to disengagement by the outward cylindrical wall 34. Therefore, both the funnel support 12 and belt 30 do not get out of place with respect to their entire circumferences, thereby permitting the funnel support 12 to be stably disposed on the funnel body 10 without the funnel support 12 being out of place.

Figure 2:
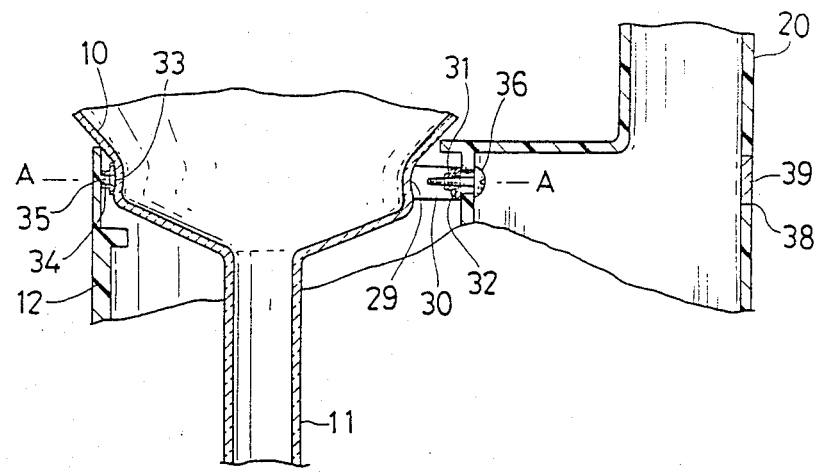
FIG. 2 is an enlarged, longitudinally sectioned view of the main part of a handle of a second container of an embodiment, wherein the fitting construction of the handle is illustrated.

In FIG. 2, reference numeral 38 denotes an access hole for binding the screw 37 which is provided for the handle 20, and reference numeral 39 a cover for closing the access hole 38.

As shown in FIG. 1, by turning around the funnel in the state of press-fitting and compressing the gasket 17 against the opening of the flask 5, the funnel 9 engages an engagement projection 18 beneath the pouring opening 6 and an engagement projection 19 with an engagement socket 8, respectively, so that each engagement can be retained by means of elasticity of the gasket 17 and the juncture between the flask 5 and funnel 9 can be securely sealed.

The funnel support 12 described above integrally forms a handle 20 at a position where it faces the handle 7 on the flask 5 and provides a control valve 21 at a position which is covered with the handle 20 therefore. The control valve 21 comprising shape-memory alloy 22, spring 23, and valve body 24, opens the inside of the flask 5 to expose itself to the air in the open state in the normal temperature, and then closes the same when an ambient temperature inside the flask 5 reaches a specified temperature.

In FIG. 1, reference numeral 25 denotes a heat sensing device used for sensing temperatures at the bottom of the flask 5, reference numeral 26 a main switch, and reference numeral 27 a power indication lamp, which are all disposed on the heating means 1. The outer diameter $L_3$ of a heating plate of the heating means 1 is set to a larger value than that $L_2$ of the bottom of the flask 5, thereby providing a non-contact portion of the outer periphery in respect to the flask 5. Furthermore, the inner diameter $L_4$ on the top opening of the concave $1a$ of the heating means 1 on which the heating plate 4 is disposed is set to a larger value than that of the outer diameter $L_2$ of the bottom and that of the outer diameter $L_1$ of the middle of the flask 5, thereby facilitating hot air inside the concave 1a to escape outward after the completion of heating. With such a configuration of each diameter, excessive heat generated by the heating plate 4 can be effectively dissipated from the periphery thereof after the power supply to the heater 3 is stopped. Consequently, the heat quantity of the heating plate 4 which is effective at the bottom of the flask 5 is reduced, thereby facilitating the temperature decrease of the flask 5. Therefore, the coffee solution can be retrieved from the funnel 9 since the inside of the flask 5 is made into the state of negative pressure in a relatively short time after the stoppage of the power supply to the heater 3.

Figure 5:
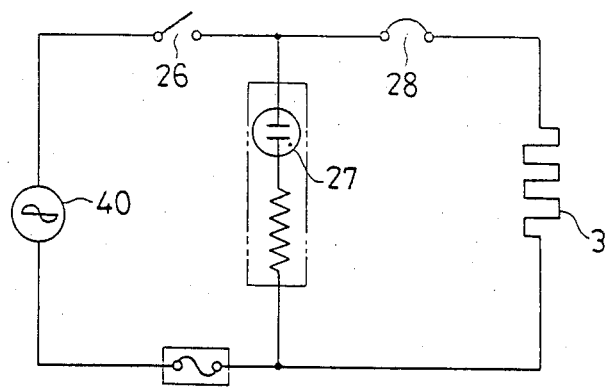
FIG. 5 is a circuit diagram of an embodiment.

FIG. 5 illustrates a circuit diagram, wherein numeral 3 denotes a heater, 26 a main switch, 27 a power indication lamp, 28 a thermostat which is incorporated in the heat sensing device 25, and 40 the power supply.

In the construction as above, the funnel 9 is which coffee powder 42 is received and the flask 5 in which water 41 is received are connected to each other, then the main switch 26 is turned on after the flask 5 having been placed on the heating plate 4, and the water 41 in the flask 5 is heated by the heater 3 to result in the rise of temperature, thereby starting to vapor the water. However, the pressure inside the flask 5 does not immediately increase because the inside of the flask 5 is exposed to the air by the control valve 21 in the open state. The temperature of the water rises nearly to the boiling point, and a large quantity of vapor begins to be actively produced. When the ambient temperature in the flask 5 reaches the specified one, the control valve 21 is closed. Accordingly, a rapid increase in pressure inside the flask 5 resulting from the sealed condition therein forces the boiling water in the flask 5 up into the funnel 9 by way of the pipe 11 and filter 14, whereby flavor and aroma can be effectively extracted by the hot water being contacted with the coffee powder 42.

If the quantity of the boiling water inside the flask 5 decreases to cause unloaded heating, the thermostat 28 senses the rapid temperature increase to stop the power supply to the heater 3. Then, the pressure in the flask 5 decreases in proportion to the temperature decrease therein, and the coffee solution in the funnel 9 is retrieved and received by way of the filter 14 and pipe 11 when the pressure inside the flask 5 is turned to be in the state of negative pressure.

After the extraction of the coffee essence, the funnel 9 can be drawn from the flask 5 so as to allow the coffee solution in the flask 5 to be poured in to coffee cups, etc. when the engagement projections 18 and 19 are disengaged from the pouring opening 6 and engagement socket 8 by the flask 5 and funnel 9 being turned relatively with each other, while the handles 7 and 20 are being held.

Figure 6:
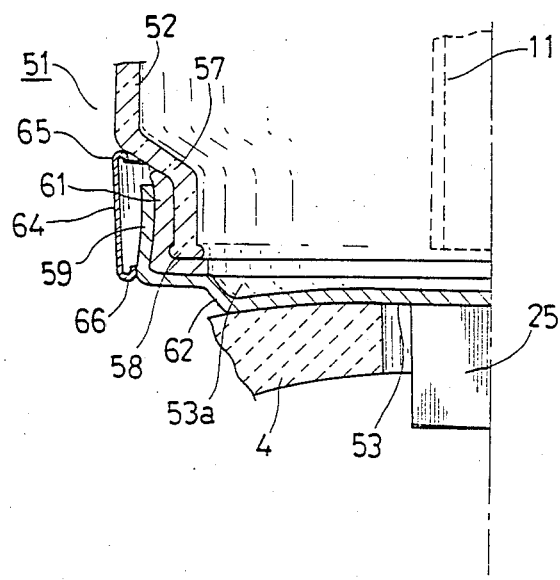
FIG. 6 is an enlarged, longitudinally sectioned view of the main part of a first container of another embodiment according to the present invention.
Figure 7:
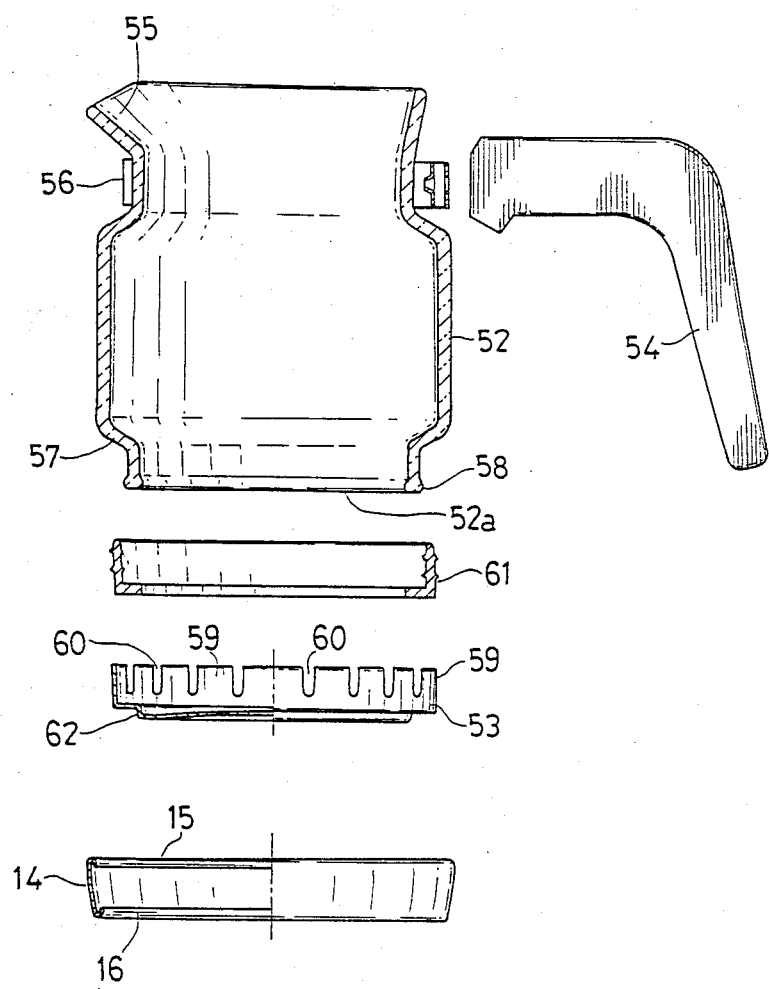
FIG. 7 is an exploded, longitudinally sectioned view of the first container of another embodiment according to the present invention wherein the construction is illustrated.

FIGS. 6 and 7 are longitudinally sectioned views of another embodiment according to the present invention, wherein the construction of a first container is illustrated.

A flask 51 comprises a container body 52 made of borosilicate glass, a bottom lid 53 made of stainless steel, a handle 54, etc.

The container body 52 comprising a pouring opening 55 on the upper end thereof is fitted with the handle 54 at the opposite position to the pouring opening 55 by means of a binding belt 56. Also, the container body 52 is provided with a stepped portion 57 so as to make the diameter of the bottom smaller than that of the middle section, having a second opening 52a at the bottom and a small projected strip 58 around the outer periphery at the bottom end of the second opening 52a.

The bottom lid 53 forms a rising wall 59 on the edge of the outer periphery thereof. A multiplicity of slits 60, each having a proper depth from the upper edge, are formed on the rising wall 59. The bottom lid 53 is fitted on the bottom periphery of the container body 52 with a rubber gasket 61 whose cross section is in the L shape, thereby binding the gasket 61 in the position between the end face and outer periphery of the container body 52. The bottom surface of the bottom lid 53 has been processed into the one in the spherical shape so as to take measures against heat deformation, after the bottom having been formed such that the entire bottom except its outer periphery is lower than the bottom 62 by one step.

The rising wall 59 is tapered inward and the gasket 61 is press-fitted around the outer peripheral surface of the container body 52 by means of the slits 60 thereof, while the projected strip 58 is bitten into the gasket 61. A cover 64 which is in the annular shape comprises curved parts 65 and 66 on the upper and lower ends thereof, respectively, whereby the diameter of the bottom end is made smaller than that of the top end. The curved part 66 on the bottom end is press-fitted around the periphery of the rising wall 59 of the bottom lid 53. Thus, as shown in FIG. 6, the cover 64 helps improve the appearance by covering slits 60 at the juncture between the container body 52 and bottom lid 53, etc. In order to compensate the fixation of the bottom lid 53 on the container body 52, the elastic wire may also be wound around the outer periphery of the rising wall 59.

In the construction as described above, the bottom lid 53 had been processed into the one which is in the spherical shape after the bottom surface has been made one-step lower than the stepped portion 62, so as to prevent the gasket 61 from being heated higher than its tolerable temperature. In a vacuum coffee maker the flask 51 nearly becomes in the state of unloaded heating when the boiling water in the flask 51 ascends into the funnel by way of the pipe 11. Even in such a case, the temperature of the gasket 61 can be kept from rising by virtue of the boiling water being ensured to remain in the annular groove 53a of the bottom lid 53 on the flask 51.

Figure 8:
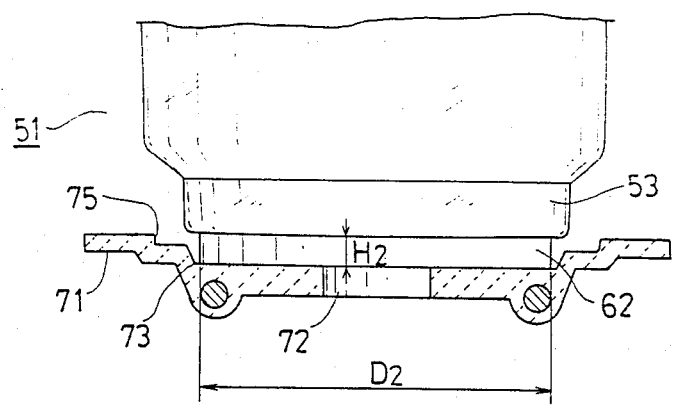
FIG. 8 is an illustration wherein the relations between a heating means and a heating plate of the first container of another embodiment is depicted.
Figure 9:
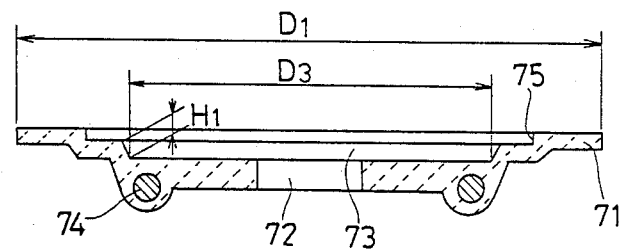
FIG. 9 is a longitudinally sectioned view of the heating plate of another embodiment.
Figure 10:
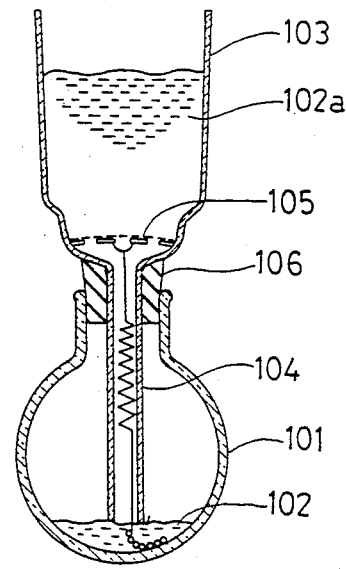
FIG. 10 is a longitudinally sectioned view of the conventional vacuum coffee maker.

FIGS. 8 and 9 are longitudinally sectioned views of a heating plate of a heating means of another embodiment according to the present invention.

A flask to be used together with a heating plate 71 of this embodiment is preferably the flask 53 which comprises the bottom lid 53 made of metal, as described previously.

A heating plate 71 includes a hole 72 for the heat sensing device 25 to be fitted therethrough and the outer diameter $D_1$ thereof which is sufficiently larger than that $D_2$ of the bottom or that of the bottom lid 53. The heating plate 71 forms a concave 73 on the top center corresponding to the bottom shape of the flask 51, wherein the inner diameter $D_3$ of the concave 73 is set to the relation which is expressed as $D_3 \geqq D_2$ and the depth $H_1$ of the same is set to the relation which is expressed as $H_1 < H_2$, where $H_2$ is the height of the stepped portion 62 of the bottom lid 53. In FIG. 9, reference numeral 74 denotes a heater which is integrally incorporated in the lower portion of the concave 73 of the heating plate 71, and reference numeral 75 denotes an annular stepped portion which is disposed on the top surface of the heating plate 71 in such a manner that it may be placed around the outer periphery of the concave 73 thereof.

With the construction as described above, the flask 51 can be securely fitted on the bottom surface of the concave 73 of the heating plate 71 and, further, in this state the heat sensing device 25 accurately senses the temperature change of the bottom by contacting the bottom center of the flask 51, whereby the heat sensing device is stably operated.

It should be understood that the scope of the present invention is not limited to the one which has been described for a descriptive purpose in the above embodiment, wherein an engagement retaining means comprises a pair of engagement sockets disposed on a flask and a pair of engagement projections provided on a funnel. For example, clamps, etc. may also be used.

Figure 3:
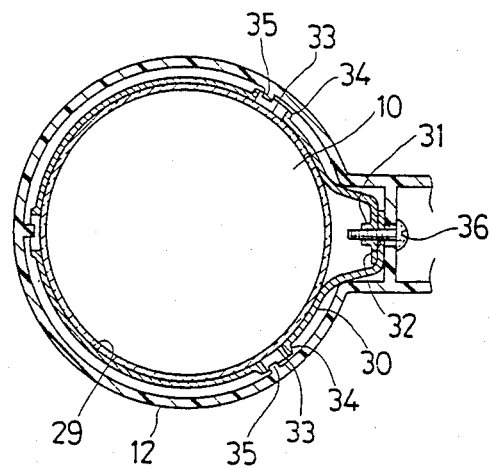
FIG. 3 is a sectional view taken along line A—A in FIG. 2.
Figure 4:
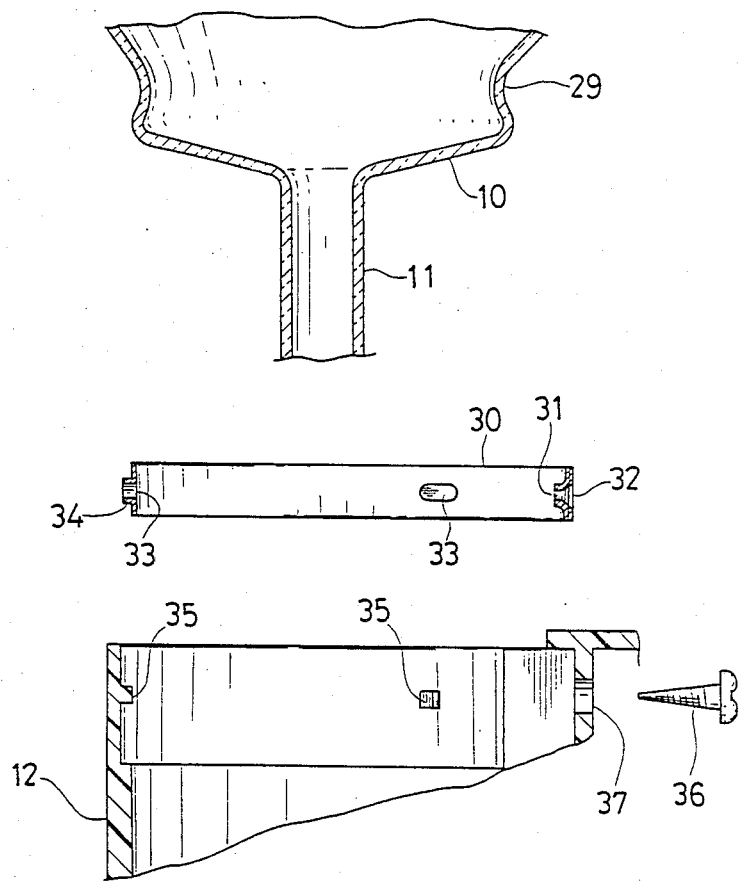
FIG. 4 is an exploded, longitudinally sectioned view of the main part of the handle of the second container, wherein the fitting construction of the handle is illustrated.

Although a description has been made of the fitting construction of a handle in the case of a funnel in FIGS. 2 to 4, a container support on which a handle has been integrally formed can be disposed on a container body by means of a metallic belt in the case of a flask, similar to the case of the funnel, as well.

What is claimed is:

1. A vacuum coffee maker comprising;
 a first container having a handle on the outer periphery and an opening on the top thereof;
 a second container in a funnel shape having a handle on the outer periphery thereof and engaging the opening of the first container in a sealed state by a gasket interposed therebetween, wherein the bottom is vertically provided with a pipe;
 engagement retaining means, whereby the engagement of the first container with the second container is retained by the gasket being compressed and interposed therebetween;
 heating means including a heater and a heating plate whose outer dimension is greater than that of the bottom of the first container, whereby a liquid inside the first container which is to be mounted on the heating plate is heated; and
 a control valve which is provided inside the handle of the second container and opened or closed by a shape-memory alloy.

2. A vacuum coffee maker according to claim 1, wherein the first container comprises a container body made of glass having a second opening at the bottom and a metallic bottom lid, which closes the second opening thereof, the bottom lid having a rising wall including a plurality of slits around the outer peripheral edge thereof and securely fitted to the container body by the rising wall which is covered with a covering member.

3. A vacuum coffee maker according to claim 1, wherein the first container and/or the second container comprises a container body, a metallic belt having at least one slot in the longitudinal direction, and an annular member integrally formed with a handle having the same quantity of projections as that of the slots which can be fittingly inserted therein, the annular member being secured on the container body by means of the metallic belt.

4. A vacuum coffee maker according to claim 1, wherein the heating means comprises a heater, a heating plate and a heat sensing device, the heating plate having a concave which corresponds to the bottom shape of the first container and a hole at the center thereof, a heat sensing device being provided in the hole so as to detect change of temperature of the bottom center of the first container.

5. A vacuum coffee maker according to claim 1, wherein said engagement retaining means comprises a first engagement socket disposed on a portion of the outer edge of the opening of the first container, a second engagement socket disposed on the fixed end of the handle of the first container, and first and second convex portions disposed on the second container relatively to the first and the second engagement sockets.

* * * * *